(12) United States Patent
Chandrasekhar et al.

(10) Patent No.: US 8,819,779 B2
(45) Date of Patent: Aug. 26, 2014

(54) METHODS AND SYSTEMS FOR MANAGING MULTIPLE INFORMATION HANDLING SYSTEMS WITH A VIRTUAL KEYBOARD-VIDEO-MOUSE INTERFACE

(75) Inventors: Babu Chandrasekhar, Round Rock, TX (US); Balamurugan Gnanasambandam, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 13/542,219

(22) Filed: Jul. 5, 2012

(65) Prior Publication Data
US 2014/0013388 A1  Jan. 9, 2014

(51) Int. Cl.
*G06F 21/70* (2013.01)
*H04L 29/08* (2006.01)

(52) U.S. Cl.
CPC ............... *G06F 21/70* (2013.01); *H04L 67/125* (2013.01)
USPC .......................................................... 726/3

(58) Field of Classification Search
CPC ............................. G06F 21/70; H04L 67/125
USPC ............................................................. 726/3
See application file for complete search history.

(56) References Cited

U.S. PATENT DOCUMENTS

| | | | |
|---|---|---|---|
| 7,873,847 B2 * | 1/2011 | Bozek et al. | 713/310 |
| 8,264,956 B2 * | 9/2012 | Ramankutty et al. | 370/228 |
| 2005/0028000 A1 * | 2/2005 | Bulusu et al. | 713/200 |
| 2005/0138346 A1 * | 6/2005 | Cauthron | 713/2 |
| 2006/0031447 A1 * | 2/2006 | Holt et al. | 709/223 |
| 2006/0203460 A1 * | 9/2006 | Aviv | 361/788 |
| 2006/0218326 A1 * | 9/2006 | Tanaka | 710/104 |
| 2009/0031014 A1 * | 1/2009 | Chu et al. | 709/222 |
| 2009/0055157 A1 * | 2/2009 | Soffer | 703/27 |
| 2010/0146592 A1 * | 6/2010 | Gamare et al. | 726/4 |
| 2010/0281094 A1 * | 11/2010 | Holt et al. | 709/201 |
| 2012/0116590 A1 * | 5/2012 | Florez-Larrahondo et al. | 700/275 |
| 2013/0173810 A1 * | 7/2013 | Subramaniam | 709/227 |
| 2013/0290694 A1 * | 10/2013 | Civilini et al. | 713/2 |

* cited by examiner

*Primary Examiner* — Techane Gergiso
(74) *Attorney, Agent, or Firm* — Jackson Walker L.L.P.

(57) ABSTRACT

According to one embodiment of the disclosure, a system includes a chassis configured to receive a plurality of modular information handling systems. The system also includes one or more chassis management controllers housed in the chassis. The chassis management controllers are configured to establish an authenticated session with available modular information handling systems present in the chassis, direct input/output communications between an information handling system designated as a selected information handling system and a remote management console coupled to the one or more chassis management controllers via a network, and maintain the authenticated sessions with one or more available modular information handling systems not designated as the selected information handling system.

9 Claims, 2 Drawing Sheets

METHODS AND SYSTEMS FOR MANAGING MULTIPLE INFORMATION HANDLING SYSTEMS WITH A VIRTUAL KEYBOARD-VIDEO-MOUSE INTERFACE

TECHNICAL FIELD

The present disclosure relates in general to information handling systems, and more particularly to managing multiple information handling systems with a virtual keyboard-video-mouse interface.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output (I/O) resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

For example, it is often desirable to remotely access individual information handling systems (e.g., servers) in chassis. For example, using traditional approaches, an administrator may remotely access information handling systems disposed in a chassis via a chassis management controller disposed in the chassis and communicatively coupled to the individual information handling systems. Communication between the management console and the chassis management controller may be in accordance with Intelligent Platform Management Interface (IPMI) or another suitable management interface protocol or standard. In such traditional approaches, the chassis management controller may serve as a virtual keyboard-video-mouse (KVM) interface between an information handling system and a management console, such that keyboard and mouse input at the management console may be processed as if such keyboard and mouse were locally coupled to the information handling system, and a display at the management console may display information as if it were locally coupled to the information handling system.

However, existing virtual KVM interfaces have numerous disadvantages. For example, existing virtual KVM interfaces typically support input/output (I/O) communication with only a single information handling system at a time. Switching to another information handling system using traditional KVM interfaces often requires a login to the information handling system, which may take significant time and negatively affect user experience.

SUMMARY

In accordance with the teachings of the present disclosure, the disadvantages and problems associated with managing multiple information handling systems with a virtual keyboard-mouse-video interface have been reduced or eliminated.

According to one embodiment of the disclosure, a system includes a chassis configured to receive a plurality of modular information handling systems. The system also includes one or more chassis management controllers housed in the chassis. The chassis management controllers are configured to establish an authenticated session with available modular information handling systems present in the chassis, direct input/output communications between an information handling system designated as a selected information handling system and a remote management console coupled to the one or more chassis management controllers via a network, and maintain the authenticated sessions with one or more available modular information handling systems not designated as the selected information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
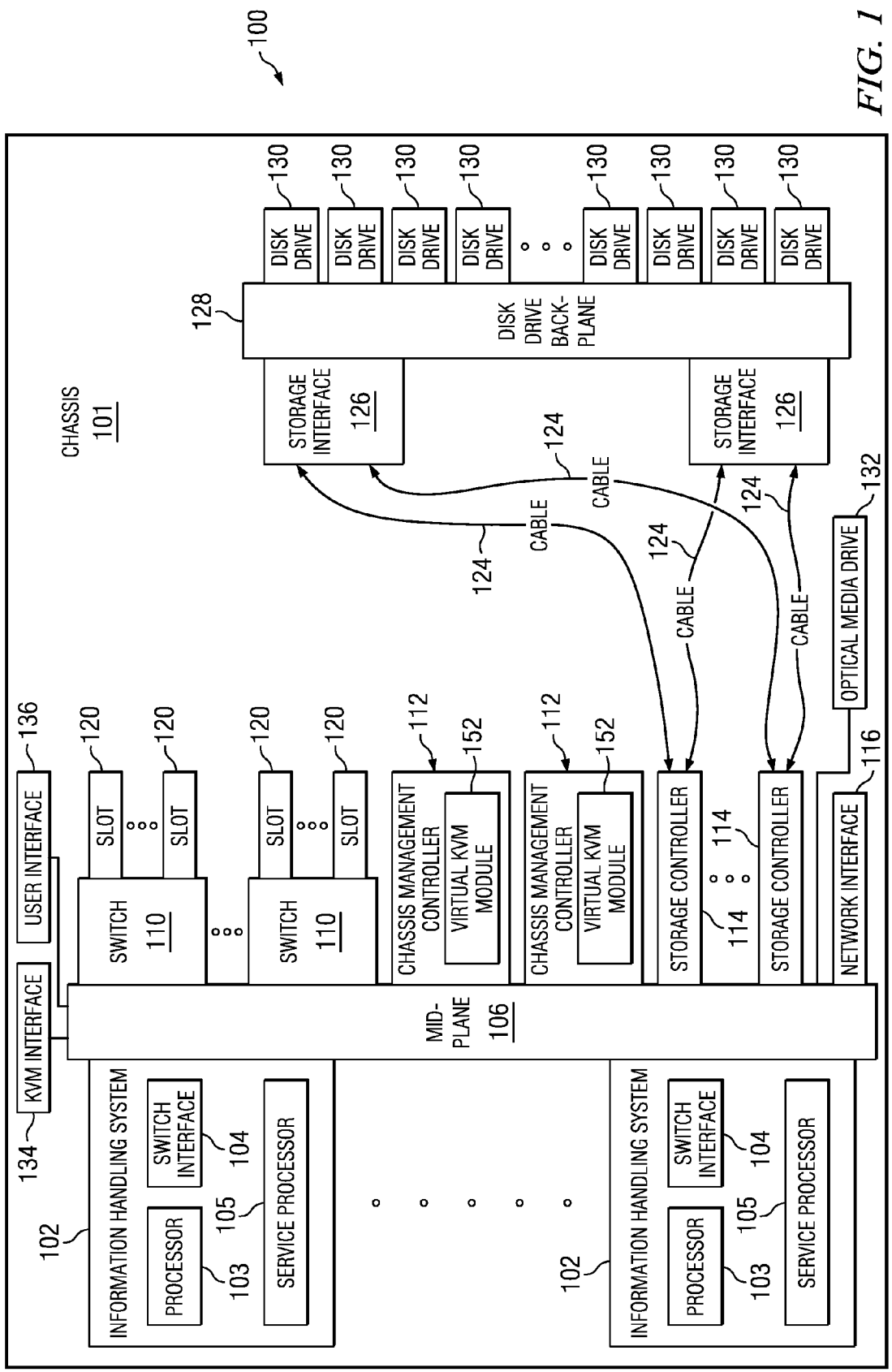
FIG. 1 illustrates a block diagram of selected components of an example system chassis with multiple information handling systems and with various peripheral and input/output capabilities common to the chassis as a whole, in accordance with certain embodiments of the present disclosure.
Figure 2:
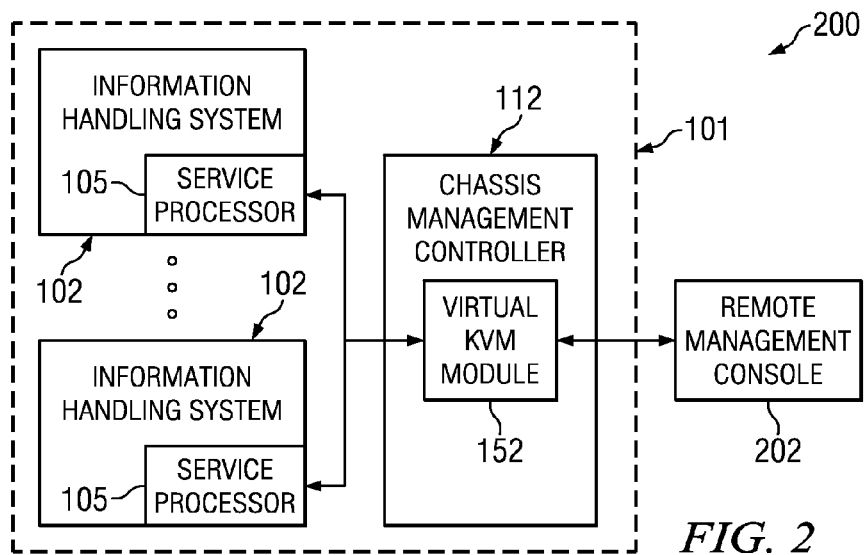
FIG. 2 illustrates a block diagram of selected components of an example system for managing multiple information handling systems with a virtual keyboard-video-mouse interface, in accordance with certain embodiments of the present disclosure.
Figure 3:
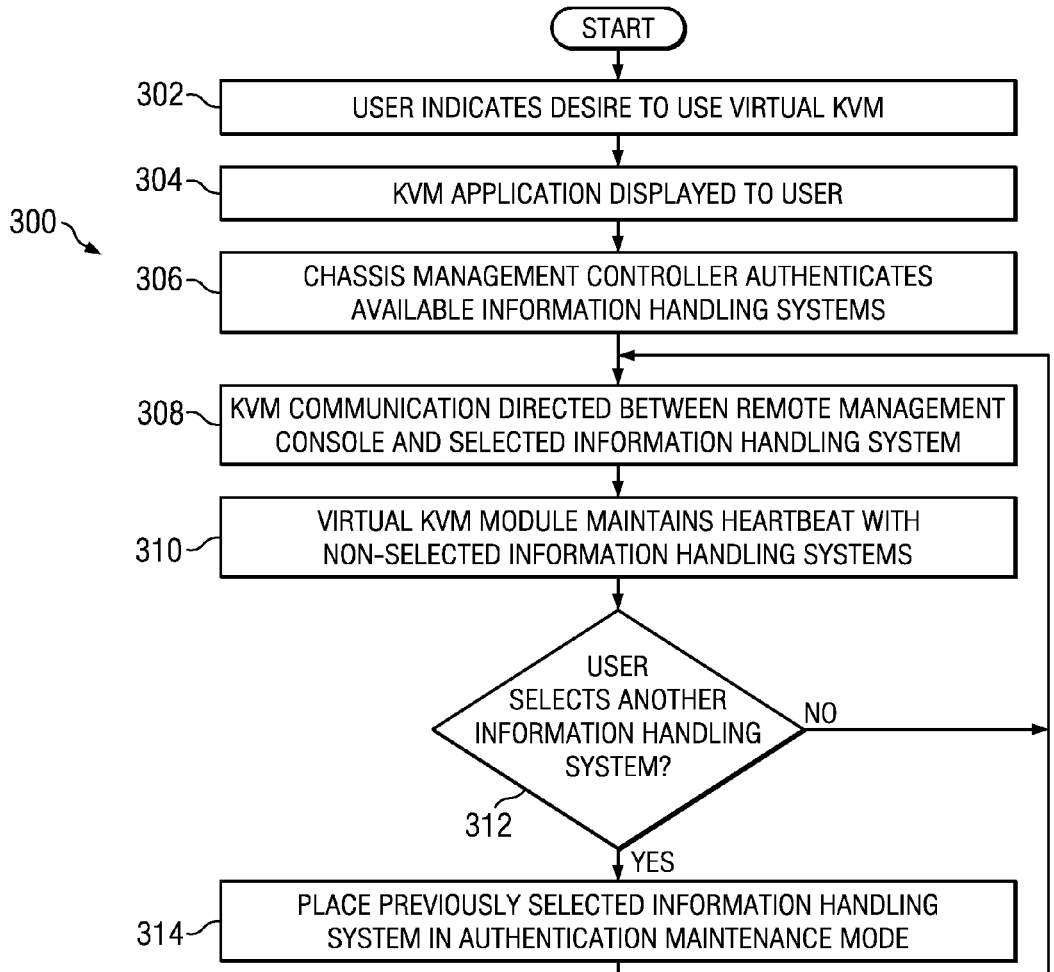
FIG. 3 illustrates a flow chart of an example method for managing multiple information handling systems with a virtual keyboard-video-mouse interface, in accordance with certain embodiments of the present disclosure.

Preferred embodiments and their advantages are best understood by reference to FIGS. 1-3 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of selected components of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse (KVM) interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103, one or more switch interfaces 104 communicatively coupled to the processor 103, and a services processor 105.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express (PCIe) switches, in which case a switch interface 104 may comprise a mezzanine card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Service processor 105 may be communicatively coupled to processor 103 and may include any system, device, or apparatus configured to permit an administrator or other person to remotely monitor and/or remotely manage an information handling system 102 (e.g., via a management console remotely connected to the information handling system 102 via a network). For example, in some embodiments, a management console may communicatively couple to chassis management controller 112 (e.g., via network 116), which in turn may communicatively coupled to service processor 105, thus providing a communications pathway between the remote management console. In some embodiments, service processor 105 may provide remote monitoring and management regardless of whether the information handling system 102 is powered on and/or has an operating system installed thereon. In certain embodiments, service processor 105 may allow for "out-of-band" control of an information handling system 102, such that communications to and from service processor 105 are communicated via a management channel physically isolated from an "in band" communication channel for non-management traffic associated with the information handling system 102. Thus, for example, if a failure occurs in information handling system 102 that prevents an administrator from remotely accessing information handling system 102 via its traditional network interface (e.g., operating system failure, power failure, etc.), the administrator may still be able to monitor and/or manage the information handling system 102 (e.g., to diagnose problems that may have caused failure) via service processor 105. In the same or alternative embodiments, service processor 105 may allow an administrator to remotely manage one or parameters associated with operation of information handling system 102 (e.g., power usage, processor allocation, memory allocation, security privileges, etc.). In certain embodiments, service processor 105 may include or may be an integral part of an access controller, baseboard management controller (BMC), Dell Remote Access Controller (DRAC) or an Integrated Dell Remote Access Controller (iDRAC). In these and other embodiments, service processor 105 may communicate input/output information (e.g., display data) to chassis management controller 112 and/or receive input/output information (e.g., keyboard data, mouse data) from chassis management controller 112.

Mid-plane 106 may comprise any system, device, or apparatus configured to interconnect modular information handling systems 102 with information handling resources of chassis 101. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102.

A chassis management controller 112 may be any system, device, or apparatus configured to facilitate management and/or control of system 100, its information handling systems 102, and/or one or more of its component its component information handling resources. A chassis management controller 102 may be configured to issue commands and/or other signals to manage and/or control information handling system 102 and/or information handling resources of system 100. A chassis management controller 112 may comprise a microprocessor, microcontroller, digital signal processor (DSP), application specific integrated circuit (ASIC), field programmable gate array (FPGA), erasable programmable read-only memory (EPROM), or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface (IPMI) or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

As shown in FIG. 1, a chassis management controller 112 may include a virtual keyboard-video-mouse (KVM) module 152. Virtual KVM module 152 may include any suitable system, apparatus, or device configured emulate a KVM interface acting as a switch between multiple information handling systems 102 and the keyboard, video display, and/or mouse of a remote management console communicatively coupled to system 100, thus allowing a user of the remote management console to interface with a plurality of information handling systems 102 via a single keyboard, video display, and/or mouse. Virtual KVM module 152 may be implemented in hardware, software (e.g., a program of instructions embodied in computer-readable media), firmware, or a combination thereof. Additional functionality of virtual KVM module 152 may be described in greater detail below with reference to FIGS. 2 and 3.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output (I/O) routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, a switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such manner). Accordingly, a full-height riser may itself physically couple with a low-profile to mid-plane 106, a switch 110, or another components, and full-height cards may then be coupled to full-height slots of full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card (NIC). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network (LAN) on motherboard (LOM) interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI (SAS) expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc (CD), digital versatile disc (DVD), blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display (LCD), cathode ray tube (CRT), a plasma screen, and/or a digital light processor (DLP) projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

FIG. 2 illustrates a block diagram of selected components of an example system 200 for managing multiple information handling systems 102 with a virtual KVM interface 152, in accordance with certain embodiments of the present disclosure. As shown in FIG. 2, a remote management console 202 (e.g., an information handling system) may be communicatively coupled to a virtual KVM module 152 of a chassis management controller 112 via a network. Chassis management controller 112 and remote management console 202 may be configured to communicate with each other via IPMI or another suitable management protocol or standard. In addition, virtual KVM module 152 may be communicatively coupled to service processor 105 (e.g., via mid-plane 106). In operation, virtual KVM interface 152 may create and maintain authenticated sessions to multiple service processors 105 simultaneously. For a then currently selected or "active" information handling system 102, keyboard, video, and or mouse data may be exchanged between remote management console 202 and the service processor 105 of the selected information handling system 102. For other information handling systems 102 then not currently selected, a heartbeat or similar message may communicated from virtual KVM module 152 to service processors 105 of the then not currently selected information handling systems, thus keeping the authenticated sessions running. When a user at the remote console selects another information handling system (e.g., via appropriate command or keystroke) the formerly-selected information handling system 102 may be placed in heartbeat mode and virtual KVM module 152 may shift its KVM focus to the newly-selected information handling system 102. Because authentication to the newly-selected information handling system 102 has already been performed, the switch to the newly-selected information handling system 102 should be substantially instantaneous, as login and authentication will not be required.

FIG. 3 illustrates a flow chart of an example method 300 for managing multiple information handling systems with a virtual keyboard-video-mouse interface (e.g., virtual KVM interface 152), in accordance with certain embodiments of the present disclosure. According to certain embodiments, method 300 may begin at step 302. As noted above, teachings of the present disclosure may be implemented in a variety of configurations of system 100 and system 200. As such, the preferred initialization point for method 300 and the order of the steps 302-314 comprising method 300 may depend on the implementation chosen.

At step 302, a user at remote management console 202 may indicate a desire to access an information handling system 102 via virtual KVM 152. Such desire may be manifested via any suitable action of the user with a user interface of remote management console 202 (e.g., key stroke, mouse click, etc.).

At step 304, in response to the user's indication of a desire to access an information handling system 102 via virtual KVM 152, a KVM application may be displayed to the user, so that the user may interact with the application. Such application may be a part of the management software of remote management console 202 and/or may be downloaded to remote management console 202 in response to the user's indication of a desire to access an information handling system 102 via virtual KVM 152.

At step 306, a chassis management controller 112 may login to and authenticate available information handling systems 102. While authenticating information handling systems 102, chassis management controller 112 may select one of the available information handling systems 102 for KVM focus. Such selection may be based on a user preference or selection manifested by the user when launching the KVM application, may be automatic (e.g., in accordance with a default), or otherwise.

At step 308, virtual KVM may direct keyboard, video, and/or mouse communication between remote management console 202 and service processor 105 of the selected information handling system 102, thus permitting a user at remote management console 202 to interact with the selected information handling system 102 via a keyboard, mouse, and/or display of remote management console 202.

At step 310, virtual KVM module 152 may maintain authenticated sessions with non-selected information handling systems 102 by periodically communicating heartbeat or similar messages to such non-selected information handling systems 102.

At step 312, virtual KVM module 152 may determine whether the user has manifested a desire to selected another information handling system 102 (e.g., by executing a particular command or keystroke). If the user has manifested a desire to select another information handling system 102, method 312 may proceed step 314. Otherwise, if the user has not manifested a desire to selected another information handling system 102, method 300 may proceed again to step 308.

At step 314, in response to a user desire to selected another information handling system, virtual KVM module 152 may place the previously-selected information handling system 102 in an authentication maintenance mode, such that virtual KVM module 152 communicates a periodic heartbeat message or other message to service processor 105 of the previously-selected information handling system 102.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, system 200 components thereof (e.g., virtual KVM module 152), or any other system operable to implement method 300. In certain embodiments, method 300 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
 a chassis configured to receive a plurality of modular information handling systems; one or more chassis management controllers housed in the chassis and configured to:
 establish one or more authenticated sessions, wherein each authenticated session is established between a respective modular information handling system present in the chassis and at least one of the one or more chassis management controllers:
 direct input/output communications between an information handling system designated as a selected information handling system and a remote management console coupled to the one or more chassis management controllers via a network; and
 for each modular information handling system not designated as the selected information handling system, maintain the authenticated session associated with such information handling system;
 wherein the one or more chassis management controllers are configured to maintain the authenticated sessions with the modular information handling systems not designated as the selected information handling system by communicating periodic heartbeat messages to the information handling systems.

2. The system according to claim 1, the input/output communications comprising at least one of video, keyboard, and mouse communications.

3. The system according to claim 1, the one or more chassis management controllers further configured to:
 receive an indication of a user desire to select a different information handling system as the selected information handling system;
 direct input/output communications between the remote management console and the information handling system designated as the selected information handling system in accordance with the indication of the user desire; and
 maintain the authenticated session with the information handling system designated as the selected information handling system prior to the indication of the user desire.

4. A method comprising:
 establishing one or more authenticated sessions wherein each authenticated session is established between a respective modular information handling stem present in a chassis configured to receive a plurality of modular information handling systems and at least one chassis management controller received by the chassis:
 directing input/output communications between an information handling system designated as a selected information handling system and a remote management console coupled to at least one chassis management controller via a network; and
 for each modular information handling system not designated as the selected information handling system maintaining the authenticated session associated with such information handling system;
 wherein maintaining the authenticated sessions with the modular information handling systems not designated as the selected information handling system comprises communicating periodic heartbeat messages to the information handling systems.

5. The method according to claim 4, the input/output communications comprising at least one of video, keyboard, and mouse communications.

6. The method according to claim 4, further comprising:
 receiving an indication of a user desire to select a different information handling system as the selected information handling system;
 directing input/output communications between the remote management console and the information handling system designated as the selected information handling system in accordance with the indication of the user desire; and
 maintaining the authenticated session with the information handling system designated as the selected information handling system prior to the indication of the user desire.

7. An article of manufacture, comprising:
 a non-transitory computer readable medium;
 computer-executable instructions carried on the non-transitory computer readable medium, the instructions readable by a processor, the instructions, when executed, for causing the processor to:
 establish one or more authenticated sessions wherein each authenticated session is established between a respective modular information handling system present in a chassis configured to receive a plurality of modular information handling systems and at least one chassis management controller received by the chassis;
 direct input/output communications between an information handling system designated as a selected information handling system and a remote management console coupled to at least one chassis management controller via a network; and
 for each modular information handling system not designated as the selected information handling system maintain the authenticated session associated with such information handling system;
 wherein maintaining the authenticated sessions with the modular information handling systems not designated as the selected information handling system comprises communicating periodic heartbeat messages to the information handling systems.

8. The article according to claim 7, the input/output communications comprising at least one of video, keyboard, and mouse communications.

9. The article according to claim 7, the instructions for further causing the processor to:
- receive an indication of a user desire to select a different information handling system as the selected information handling system;
- direct input/output communications between the remote management console and the information handling system designated as the selected information handling system in accordance with the indication of the user desire; and
- maintain the authenticated session with the information handling system designated as the selected information handling system prior to the indication of the user desire.

* * * * *